(12) United States Patent
Kumagai et al.

(10) Patent No.: US 6,719,114 B2
(45) Date of Patent: Apr. 13, 2004

(54) CLUTCH OUTER

(75) Inventors: Kouichi Kumagai, Shizuoka (JP); Takashi Kodama, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 10/226,311

(22) Filed: Aug. 23, 2002

(65) Prior Publication Data
US 2003/0038012 A1 Feb. 27, 2003

(30) Foreign Application Priority Data
Aug. 24, 2001 (JP) ........................ 2001-254991

(51) Int. Cl.$^7$ ............................... F16D 13/58
(52) U.S. Cl. ..................................... 192/70.2
(58) Field of Search .................. 192/70.2, 89.26, 192/112, 115; 164/213, 131

(56) References Cited

U.S. PATENT DOCUMENTS

| | | | | |
|---|---|---|---|---|
| 1,851,700 A | * | 3/1932 | Gibbs .................. | 192/70.12 |
| 1,886,865 A | * | 11/1932 | Bixby .................. | 192/112 |
| 4,010,833 A | | 3/1977 | Brendel et al. | |
| 4,585,105 A | * | 4/1986 | Iio et al. .............. | 192/70.2 |
| 6,095,006 A | * | 8/2000 | Morita et al. ......... | 192/70.2 |
| 6,360,861 B1 | * | 3/2002 | Sumi et al. ........... | 192/70.17 |
| 6,523,663 B2 | * | 2/2003 | Murata ................ | 192/70.2 |

FOREIGN PATENT DOCUMENTS

| | | |
|---|---|---|
| JP | 33 11 590 A1 | 10/1984 |
| JP | 2-180380 A | * 7/1990 |
| JP | 5-248512 | 9/1993 |
| JP | 3120291 | 10/2000 |
| JP | 2 805 190 | 8/2001 |

OTHER PUBLICATIONS

"Manufacturing Engineering and Technology", Prof. Kalpakjian, *Metal–Casting Processes and Equipment*, pp. 274, 304 and 342, 1989.

* cited by examiner

*Primary Examiner*—Rodney H. Bonck
(74) *Attorney, Agent, or Firm*—Arent Fox Kintner Plotkin & Kahn, PLLC

(57) ABSTRACT

A clutch outer includes a cylindrical portion with a plurality of slits defined therein which extend in an axial direction of the cylindrical portion. Engagement claws on outer peripheries of a plurality of friction plates slidably engage the slits. Each slit includes a wide portion defined on an inner periphery of the cylindrical portion and into which the engagement claws are engaged, and a narrow portion defined on an outer periphery of the cylindrical portion with a width in a circumferential direction of the cylindrical portion being smaller than that of the wide portion. The wide and narrow portions are connected through a step facing a radially inward direction of the cylindrical portion. A draft for the wide portion during die-casting is less than a draft for the narrow portion, and a die-parting face in the die-casting is established on the side of the outer periphery of the cylindrical portion.

1 Claim, 5 Drawing Sheets

CLUTCH OUTER

BACKGROUND OF THE INVENTION

1. Field of the Invention

The present invention relates to an clutch outer which is formed by die-casting to have a cylindrical portion and an end wall leading to one end of the cylindrical portion, and in which slits are defined in the cylindrical portion at a plurality of points circumferentially equally spaced apart from one another to extend in an axial direction of the cylindrical portion so that one end of each slit is closed by a portion closer to the end wall and the other end of each slit opens into the other end of the cylindrical portion, and a plurality of friction plates having engagement claws provided on their outer peripheries are slidably engaged into the slits. The invention particularly relates to an improvement in shape of each slit.

2. Description of the Related Art

Such a conventional clutch outer is known, for example, from Japanese Patent No. 3120291 or the like. The slits are defined in the cylindrical portion at a plurality of circumferential points so that their portions on the sides of inner and outer peripheries of the cylindrical portion of the clutch outer have the same width.

In the multi-plate clutch constructed using such a clutch outer, it is desired that the friction plates are formed of an inexpensive thin iron plate to reduce the cost, and the number of the friction plates is decreased to provide compactness and a reduction in weight. For this purpose, it is necessary to suppress to a small level the surface pressure in contact between the engagement claws of the friction plates and the clutch outer with the engagement claws engaged in its slits, and to minimize the distance between the slits in the circumferential direction of the cylindrical portion of the clutch outer to maximize the number of the slits.

To form the clutch outer by die-casting, portions for forming the slits are provided in any one of a die for forming an inner face side potion of the clutch outer and a die for forming an outer face potion of the clutch outer. A die-parting face in each slit is established at a location flush with the outer peripheral surface or the inner peripheral surface of the cylindrical portion. In the conventional clutch outer, if a draft for the slits is set at a small value when the number of the slits is large, the resistance during opening of the dies is increased and hence, there is a possibility that a galling is generated in a product at a portion corresponding to the die-parting face. For this reason, it is necessary to set the draft for each of the slits at a large value in order to prevent the generation of the galling.

However, if the draft is increased, a relatively large difference is generated between the width of one end of the slit on the side of one end of the cylindrical portion, i.e., on the side of the end wall, and the width of the other end of the slit on the side of the other end of the cylindrical portion. Therefore, the failure of the operation of the friction plates may occur at the one end of the slit having the smaller width, while the engagement claw of the friction plate moves within the slit to generate a striking sound at the other end of the slit having the larger width.

SUMMARY OF THE INVENTION

Accordingly, it is an object of the present invention to provide a clutch outer which is designed to prevent the generation of the galling in the product and the generation of the striking sound, and to maximize the number of slits.

To achieve the above object, according to the present invention, there is provided a clutch outer which is formed by die-casting to have a cylindrical portion and an end wall leading to one end of the cylindrical portion, and in which slits are defined in the cylindrical portion at a plurality of points circumferentially equally spaced apart from one another to extend in an axial direction of the cylindrical portion so that one end of each slit is closed by a portion closer to the end wall and the other end of each slit opens into the other end of the cylindrical portion, and engagement claws provided on outer peripheries of a plurality of friction plates are slidably engaged into the slits, wherein each of the slits comprises a wide portion which is defined on the side of an inner periphery of the cylindrical portion and into which the engagement claws are engaged, and a narrow portion defined on the side of an outer periphery of the cylindrical portion with a width in a circumferential direction of the cylindrical portion being smaller than that of the wide portion, the wide portion and the narrow portion being connected to each other through a step facing a radially inward direction of the cylindrical portion; wherein a draft for the wide portion during die-casting is set at a value smaller than a draft for the narrow portion; and wherein a die-parting face in the die-casting is established on the side of the outer periphery of the cylindrical portion.

With such arrangement, each of the slits is formed into a stepped configuration such that its portion on the side of the inner periphery of the cylindrical portion is wider. By setting the draft for the narrow portions of the slits located on the side of the parting face at a relatively large value, it is possible to prevent the galling of a product to the utmost during separation of the product after die-opening. In addition, by setting at a relatively small value the draft for the wide portions, into which the engagement claws of the plural friction plates are engaged, it is possible to prevent the failure of the operation of the friction plates, and the generation of the striking sound. Thus, it is possible to maximize the number of the slits and to suppress the surface pressure of contact between the engagement claws of the friction plates and the clutch outer to a small level. Further, each of the friction plates can be formed of an inexpensive thin iron plate, leading to a cost reduction, and the number of the friction plates can be decreased, leading to compactness and a reduction in weight.

The above and other objects, features and advantages of the invention will become apparent from the following description of the preferred embodiment taken in conjunction with the accompanying drawings.

BRIEF DESCRIPTION OF THE DRAWINGS

FIG. 1 is a vertical sectional view of a wet multi-plate clutch.

FIG. 2 is a vertical sectional view of a clutch outer, taken along a line 2—2 in FIG. 3.

FIG. 3 is a view taken in a direction of an arrow 3 in FIG. 2.

FIG. 4 is an enlarged view taken in a direction of an arrow 4 in FIG. 3.

FIG. 5 is a vertical sectional vie of a die-casting apparatus in a state in which a die-casting has been completed.

DESCRIPTION OF THE PREFERRED EMBODIMENT

The present invention will now be described by way of an embodiment shown in the accompanying drawings.

Figure 1:
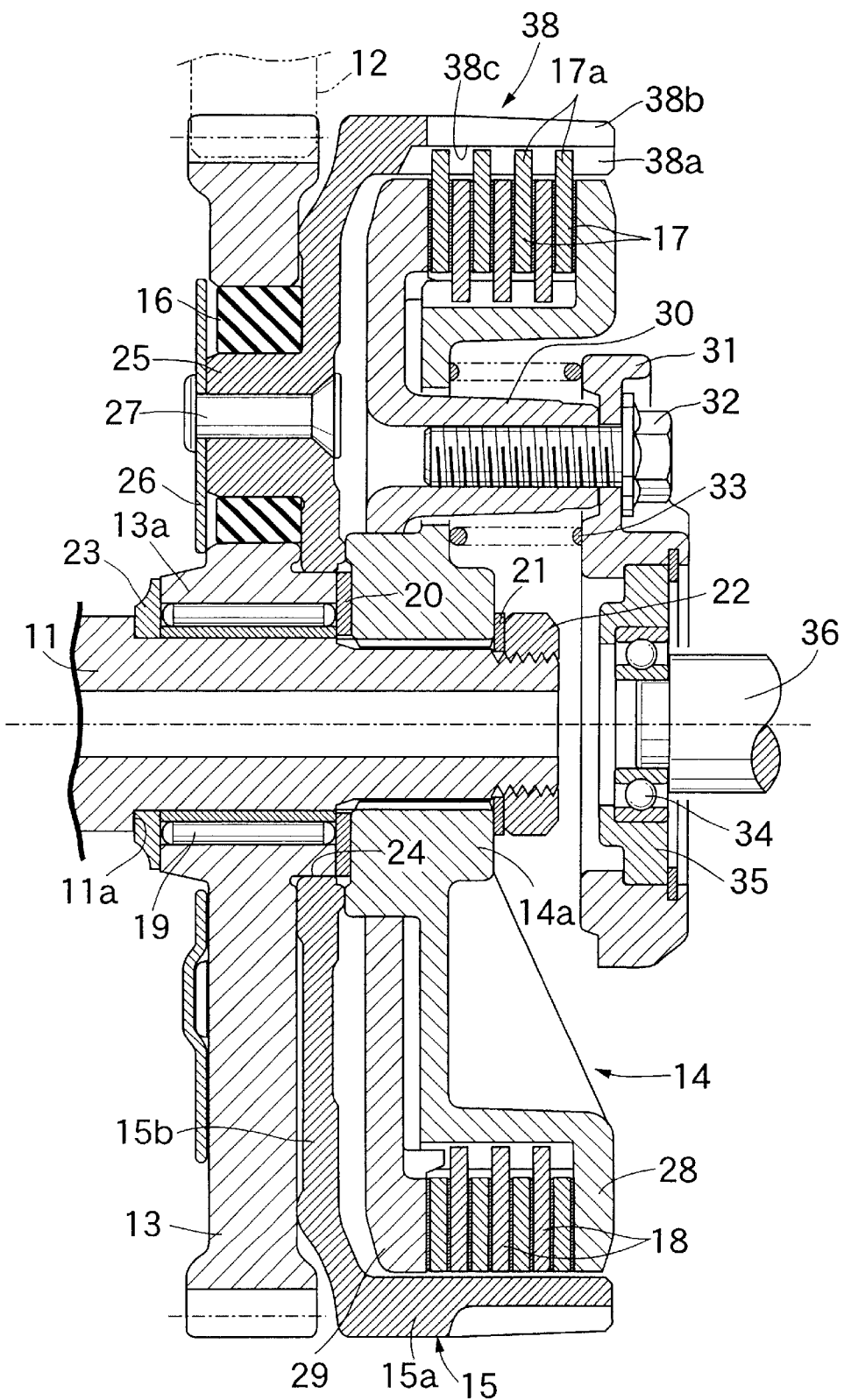
FIGS. 1 to 5 show one embodiment of the present invention.

Referring first to FIG. 1, a wet multi-plate clutch is mounted, for example, on an input shaft 11 of a transmission of a motorcycle. The wet multi-plate clutch includes a driven gear 13 rotatably carried on an input shaft 11 so that it is meshed with a driving gear 12 secured to a crankshaft of an engine, a clutch center 14 secured to the input shaft 11, a clutch outer 15 disposed between the clutch center 14 and the driven gear 13 to surround the clutch center 14, damper rubbers 16 mounted between the clutch outer 15 and the driven gear 13, a plurality of driving friction plates 17 axially slidably engaged with an inner periphery of the clutch outer 15, and a plurality of driven friction plates 18 which are disposed so that they are alternately superposed on the driving friction plates 17 and which are axially slidably engaged with an outer periphery of the clutch center 14.

The driven gear 13 has a cylindrical support tube portion 13a on its inner periphery. The support tube portion 13a is carried on the input shaft 11 with a needle bearing 19 interposed therebetween. The clutch center 14 has a boss 14a spline-coupled to the input shaft 11 with a thrust washer 20 interposed between the boss 14a and the support tube portion 13a. A nut 22 threadedly fitted over an end of the input shaft 11 is engaged with a washer 21 abutting against the boss 14a on a side opposite from the thrust washer 20. An end plate 23 abuts against an annular shoulder 11a of the input shaft 11, and the support tube portion 13a of the driven gear 13 is sandwiched between the end plate 23 and the thrust washer 20.

Figure 2:
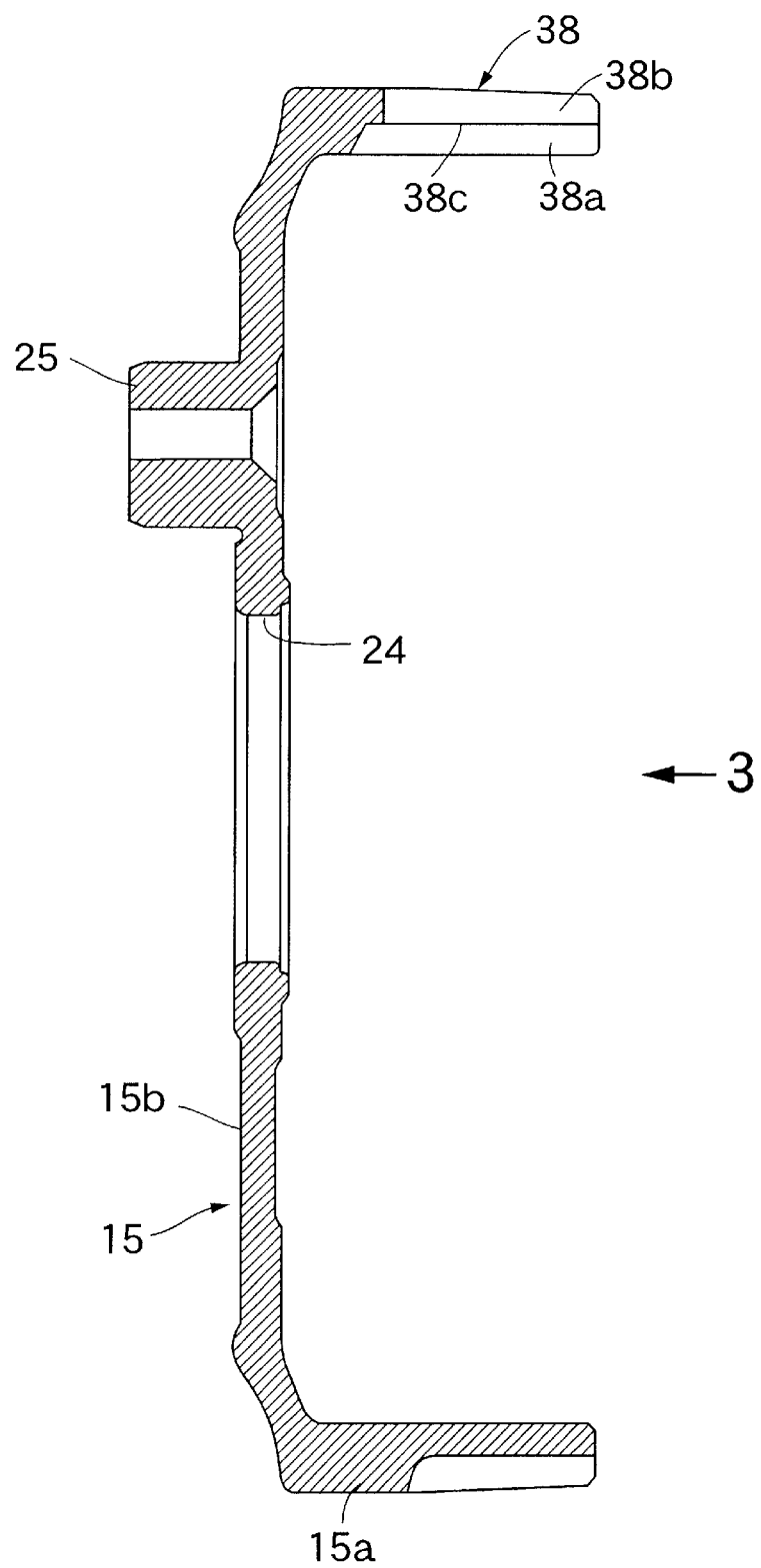
Figure 3:
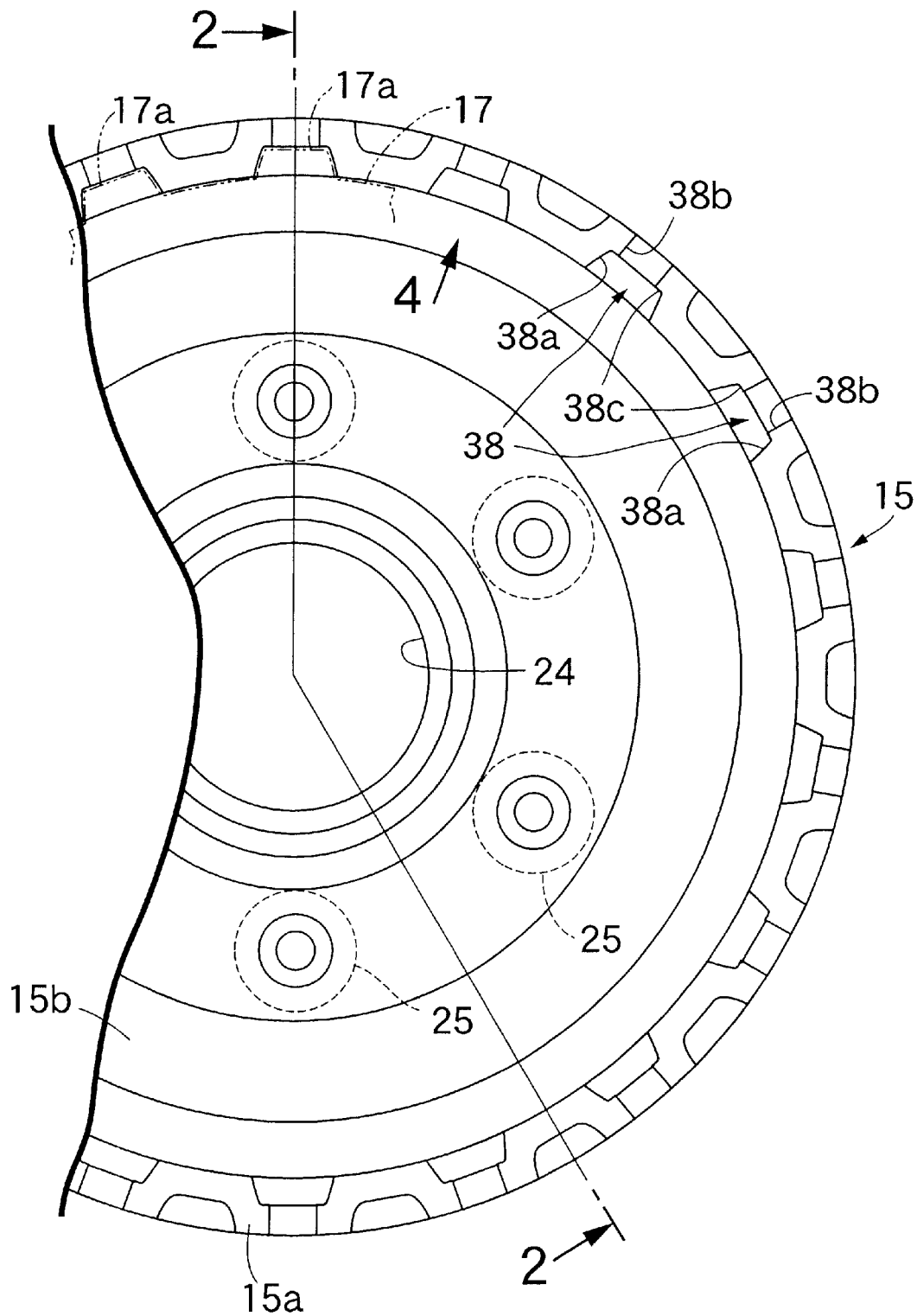

Referring also to FIGS. 2 and 3, the clutch outer 15 is formed of a light alloy, e.g., an aluminum alloy by die-casting, and integrally provided with a cylindrical portion 15a coaxially surrounding the clutch center 14, and an end wall 15b leading to one end of the cylindrical portion 15a and opposed to the driven gear 13.

The end wall 15b has a through-bore 24 provided at its central portion so that the support tube portion 13a of the driven gear 13 is inserted through the through-bore 24, and a plurality of connecting bosses 25 provided integrally and projectingly thereon, through which the plurality of damper rubbers 16 mounted on the driven gear 13 respectively pass. On the other hand, a retainer 26 is secured to tip end faces of the connecting bosses 25 by rivets 27 with the damper rubbers 16 sandwiched between the retainer 26 and the end wall 15b.

The clutch center 14 is integrally provided with a pressure-receiving plate 28 opposed to the driving friction plate 17 which is located on the outermost side of an open end of the clutch outer 15. A pressing plate 29 capable of pressing the driving friction plates 17 and the driven friction plates 18 toward the pressure-receiving plate 28 is disposed to be opposed to the driving friction plate 17 located on the innermost side of the clutch outer 15. The pressing plate 29 is integrally provided with a plurality of support shafts 30 extending through the clutch center 14 at a plurality of points. Release plates 31 are secured to tip ends of the support shafts 30 by bolts 32. Coil clutch springs 33 for biasing the pressing plate 29 toward the pressure-receiving plate 28 by a preset load are mounted under compression between the release plate 31 and the clutch center 14.

A bearing holder 35 is mounted to the release plate 31, and an outer race of a release bearing 34 is fitted to the bearing holder 35. A release rod 36 is fitted to inner race of the release bearing 34.

Figure 4:
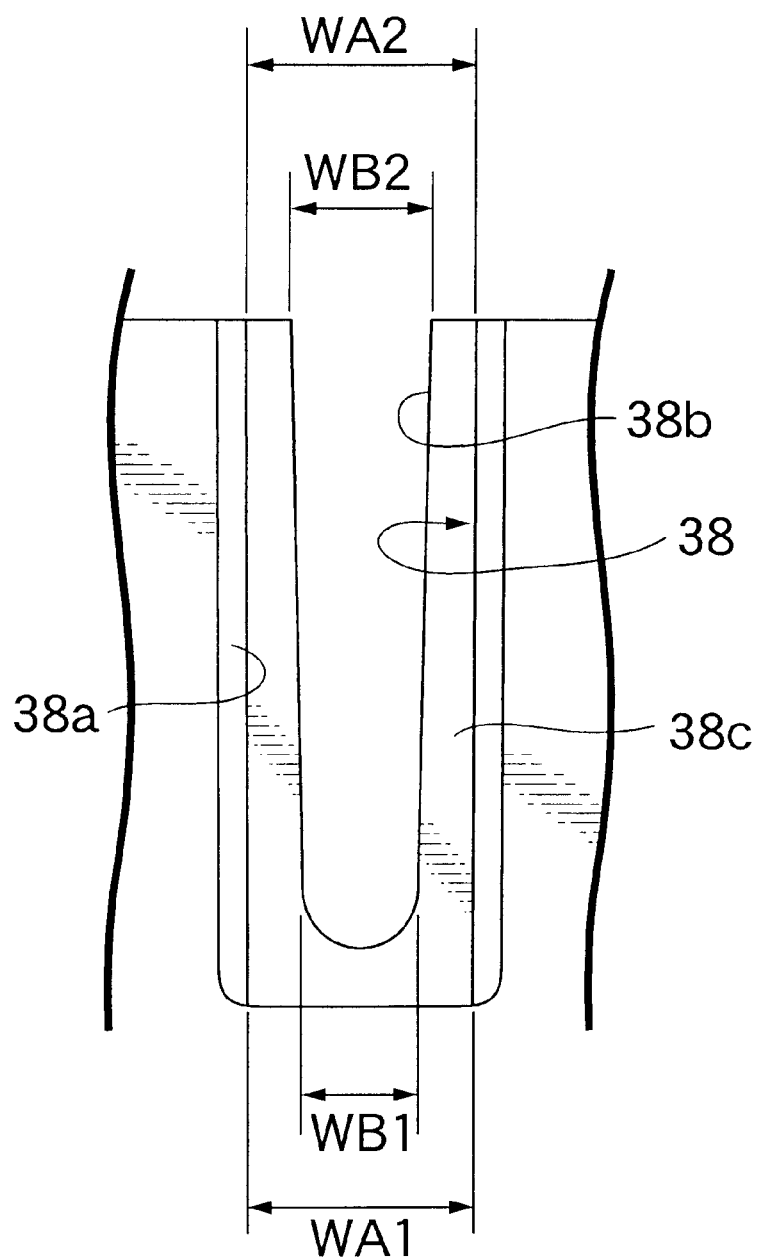

Referring also to FIG. 4, slits 38 are defined in the cylindrical portion 15a of the clutch outer 15 at a plurality of points circumferentially equally spaced apart from one another, and engagement claws 17a provided on outer peripheries of the driving friction plates 17 are slidably engaged in the slits 38 in an axial direction of the clutch outer 15.

Each of the slits 38 is formed to extend in an axial direction of the cylindrical portion 15a with one end closed by a portion closer to the end wall 15b and with the other end opening into the other end of the cylindrical portion 15a. Each of the slits 38 includes a wide portion 38a defined in the inner periphery of the cylindrical portion 15a, and a narrow portion 38b formed in the outer periphery of the cylindrical portion 15a with a width in a circumferential direction of the cylindrical portion 15a being made smaller than that of the wide portion 38a. The wide portion 38a and the narrow portion 38b are connected to each other through a step 38c facing a radially inward direction of the cylindrical portion 15a. The engagement claw 17a is engaged into the wide portion 38a, and the cross-sectional shape of the wide portion 38a is formed into, e.g., a trapezoidal shape in correspondence to the engagement claw 17a.

Figure 5:
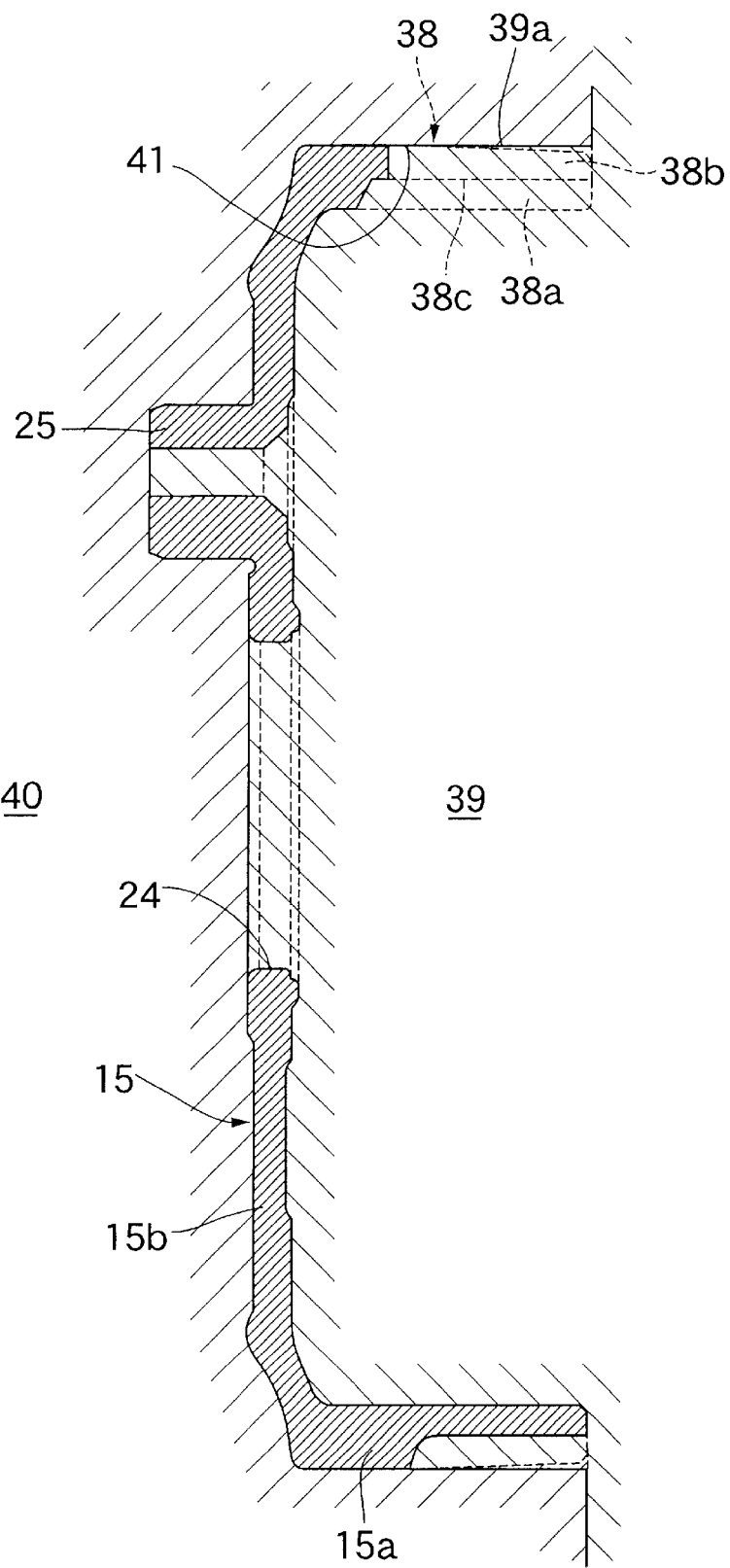

To form such clutch outer by the die-casting process, a die-casting apparatus is used, which includes a die 39 for forming an inner face portion of the clutch outer 15, and a die 40 for forming an outer face portion of the clutch outer 15, as shown in FIG. 5. The die 39 for forming the inner face side of the portion of the clutch outer 15 is integrally provided with slit-forming portions 39a for forming the slits 38, and a parting face between the dies 39 and 40 is formed on the side of the outer periphery of the cylindrical portion 15a of the clutch outer 15.

In such die-casting apparatus, the dies 39 and 40 are moved away from each other in the axial direction of the clutch outer 15 during die-opening. In order to withdraw the slit-forming portions 39a during the die-opening, a draft for the wide portion 38a of each of the slits 38 is set at a value smaller than a draft for the narrow portion 38b. More specifically, if the width of one end of the wide portion 38a is represented by WA1, the width of the other end of the wide portion 38a is represented by WA2, the width of one end of the narrow portion 38b is represented by WB1, and the width of the other end of the narrow portion 38b is represented by WB2; a relation, (WA2−WA1)<(WB2−WB1) is established. For example, (WA2−WA1) is 0.2 mm, while (WB2−WB1) is 0.8 mm.

The operation of this embodiment will be described below. The plurality of slits 38 are defined in the cylindrical portion 15a of the clutch outer 15 at the locations circumferentially equally spaced apart from one another so that the engagement claws 17a provided on the outer peripheries of the plurality of driving friction plates 17 are axially slidably engaged in the slits 38. The slits 38 are comprised of the wide portions 38a which are formed in the inner periphery of the cylindrical portion 15a and in which the engagement claws 17 are engaged, and the narrow portions 38b formed in the outer periphery of the cylindrical portion 15a with the width in the circumferential direction of the cylindrical portion 15a being smaller than that of the wide portions 38a. The wide portions 38a and the narrow portions 38b are connected to each other through steps 38c facing the radially inward direction of the cylindrical portion 15a. In other words, each of the slits 38 is formed into a stepped configuration such that its portion on the side of the inner periphery of the cylindrical portion 15a is wider.

Moreover, when the clutch outer is formed by die-casting, the draft for the wide portions 38a is set at the value smaller than the draft for the narrow portions 38*b*, and the parting face 41 between the dies 39 and 40 is established on the side of the outer periphery of the cylindrical portion 15*a*.

Therefore, the draft for the narrow portions 38*b* of the slits 38 located on the side of the parting face 41 is established at a relatively large value and hence, it is possible to prevent the galling of a product during separation of the product, after the dies 39 and 40 are parted from each other. In addition, the draft for the wide portions 38*a*, into which the engagement claws 17*a* of the driving friction plates 17 are engaged, is set at a relatively small value and hence, it is possible to prevent the failure of the operation of the driving friction plates 17, and to prevent the generation of a striking sound.

Therefore, the number of slits can be maximized, and the surface pressure of contact between the engagement claws 17*a* of the driving friction plates 17 and the clutch outer 15 can be minimized. Thus, when use in the wet multi-plate clutch for the motorcycle, each of the driving friction plates 17 can be formed of an inexpensive thin iron plate, leading to a reduction in cost, and the numbers of the driving friction plates 17 and the driven friction plates 18 can be decreased to provide compactness and a reduction in weight.

Although the embodiment of the present invention has been described in detail, it will be understood that the present invention is not limited to the above-described embodiment, and various modifications in design may be made without departing from the spirit and scope of the invention defined in the claims.

For example, the embodiment has been described as being applied to the wet multi-plate clutch for the motorcycle, but the present invention is also applicable to a clutch in an automatic transmission of a four-wheel automobile. In this case, friction plates made of iron are conventionally used, but the number of slits can be maximized, and the surface pressure of contact between engagement claws of the driving friction plates and an clutch outer can be reduced, whereby the driving friction plates and the driven friction plates can be thinned, leading to compactness and reduction in weight.

What is claimed is:

1. A clutch outer which is formed by die-casting to have a cylindrical portion and an end wall leading to one end of said cylindrical portion, and in which slits are defined in said cylindrical portion at a plurality of points circumferentially equally spaced apart from one another to extend in an axial direction of said cylindrical portion so that one end of each slit is closed by a portion closer to said end wall and the other end of each slit opens into the other end of said cylindrical portion, and engagement claws provided on outer peripheries of a plurality of friction plates are slidably engaged into said slits, wherein each of said slits comprises a wide portion which is defined on the side of an inner periphery of said cylindrical portion and into which said engagement claws are engaged, and a narrow portion defined on the side of an outer periphery of said cylindrical portion with a width in a circumferential direction of said cylindrical portion being smaller than that of said wide portion, said wide portion and said narrow portion being connected to each other through a step facing a radially inward direction of said cylindrical portion;

wherein a draft for said wide portion in the die-casting is set at a value smaller than a draft for said narrow portion; and wherein a die-parting face in the die-casting is established on the side of the outer periphery of said cylindrical portion.

* * * * *